Oct. 12, 1954
G. BABER
2,691,267
TOOL FOR SEPARATING CHAIN LINKS
Filed Jan. 5, 1953
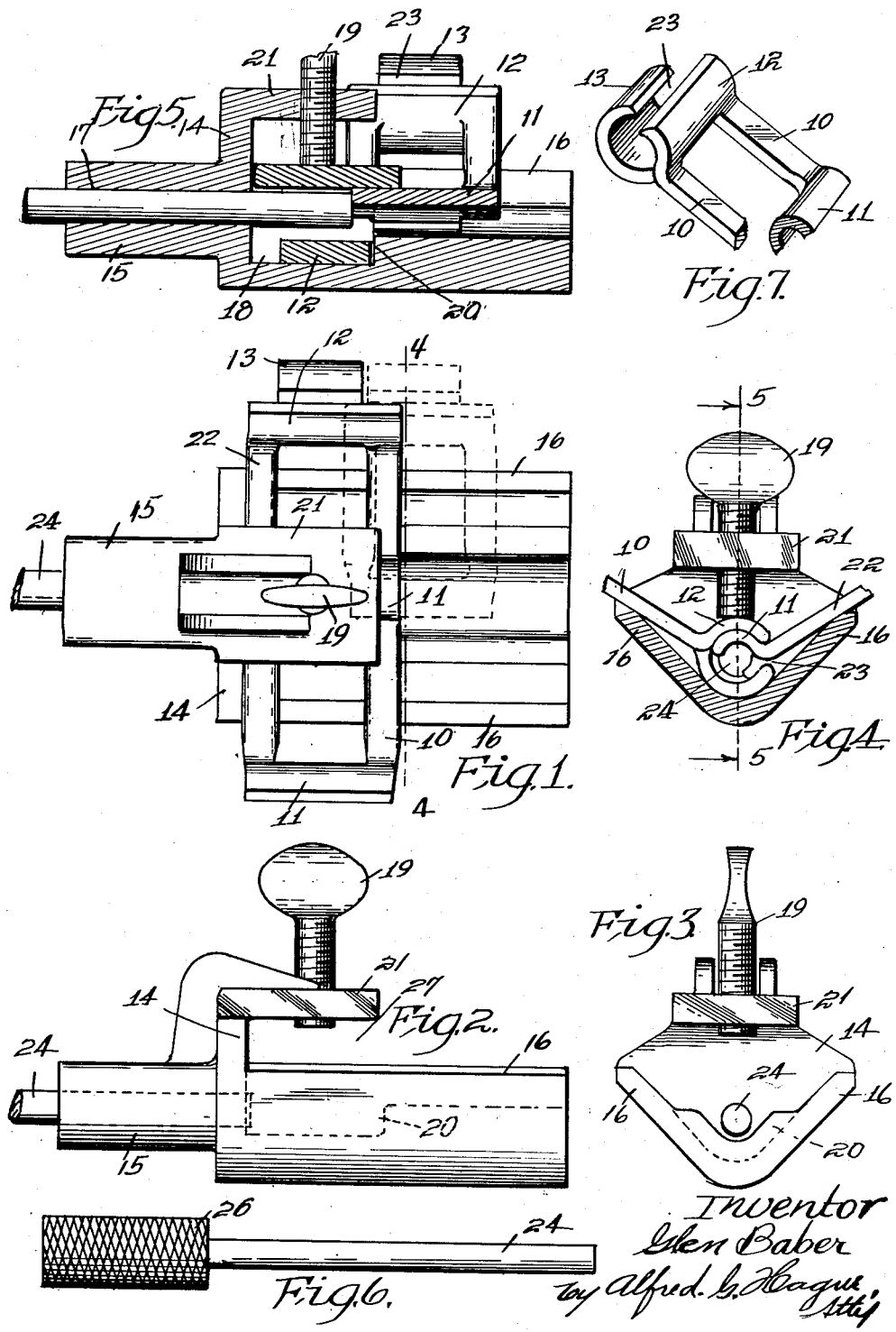

Patented Oct. 12, 1954

2,691,267

UNITED STATES PATENT OFFICE 2,691,267

TOOL FOR SEPARATING CHAIN LINKS

Glen Baber, Des Moines, Iowa, assignor to Industrial Machine and Tool Inc., Polk County, Iowa Application January 5, 1953, Serial No. 329,696

1 Claim. (Cl. 59—7)

This invention relates to an improved tool adapted to be applied to that type of chain, or link belt, employing detachable links formed of malleable iron or from pressed sheet steel and of the type in which each link is provided with a hook portion at one end and a pivot portion at the opposite end, such as is illustrated in Fig. 7, the chain or belt being formed by sliding the pivot end of one link transversely into the hooked end of the link to which it is connected. In order to prevent the links from becoming accidentally disconnected when in use, the links are so constructed that they can only be connected or disconnected when the links are supported in planes inclined one relative to the other, even when the links are supported in the necessary inclined planes the links are often hard to separate, especially if they are rusted, worn or dirty, the type of link formed from stamped sheet metal, such as illustrated in Fig. 7 being the type in most common use.

It is the object of my invention to provide a tool of light weight, simple and cheap construction which may be easily and quickly applied to or removed from a link belt while the belt is in operative position on a machine or when the belt is disconnected therefrom and when so applied provides means to assist in more easily removing links from the belt.

More particularly it is the object of my invention to provide a tool including a drive pin for removing the link to be disconnected from the belt, and a clamp for fixing the tool to the belt and simultaneously inclining the links to their proper inclination to be disconnected with the drive pin in alignment with the pivot member of the connected links to which the tool is attached, whereby the link pivot of one link may be removed from the hook of the adjoining link by striking the pin with a hammer instead of removing the link with complicated and cumbrous lever arrangement.

My invention consists in the construction, arrangement and combination of the various parts of the device, whereby the objects contemplated and attained, as hereinafter are more fully attained, as hereinafter are more fully set forth, pointed out in my claim and illustrated in the accompanying drawings, in which:

Fig. 1 is a plan view of my improved tool, and two links of a link belt clamped therein to be disconnected.

Fig. 2 is a side elevation of Fig. 1 with the links removed.

Fig. 3 is an end elevation of Fig. 2.

Fig. 4 is a sectional view taken on the line 4—4 of Fig. 1.

Fig. 5 is a sectional view taken on the line 5—5 of Fig. 4.

Fig. 6 is a side elevation of the drive pin used in connection with my improved tool.

Fig. 7 is a fragmental perspective view of a belt link formed of stamped metal.

My improved tool is adapted to be applied to that type of links used to form link belts, the links of which are adapted to be connected or disconnected from each other, the links being formed of either malleable iron or of the type blanked from sheet steel and formed to shape by power presses.

In Fig. 7 I have illustrated a belt link of the type formed of stamped sheet metal to which my improved tool is more particularly adapted to be applied when two or more of said links are connected together, to form a belt or otherwise, to assist in separating the links by sliding one link relative to the other.

The said link comprises parallel side members 10, a pivot portion 11, and a barrel portion 12 having a hook portion 13. My improved tool comprises a body portion 14 having a tubular projection 15 at one side and diverging flanges 16 projecting laterally from the opposite side to form a trough like structure supported longitudinally of the hole 17 formed in the member 15, as illustrated in Fig. 5. The inner faces of the outer ends of the flanges 16 are formed thicker than their inner ends to provide a recess 18 and a shoulder 20. The recess 18 being adapted to receive the barrel portion 12 of two connected links when in operative position. A setscrew 19 is mounted in a bracket 21 carried by the member 15 for engaging the top portion of the barrel 12 and forcing it into the recess 18 with the side portions 10 engaging the upper edges of the flanges 16 so that said side members will assume the proper angle, one relative to the other, so that the link portions 22 of the pivot 11 will be in alignment with the slot 23 between the barrel 12 and the hook 13 as illustrated in Fig. 4 and with the pivot 11 in alignment with the hole 17. The pivot member 11 of the links 22 may be disconnected from the hook portion 12 by means of a drive pin 24 by striking its enlarged end portion 26 with a hammer causing the pivot 11 and its link to be moved laterally as shown in dotted lines in Fig. 1 and in solid lines in Fig. 5.

The shoulder 20 stops the hook portion 12 against lateral movement as the driving force is applied. Thus providing a tool which is of simple construction, light weight and which can easily be applied to a link belt by releasing the set screw 19, then applying the top edge of the outer ends of the flanges to one side of the belt then moving the tool transversely to cause the belt to enter the space between the bracket 21 and said flanges with the barrel portion beneath the set screw 19. The set screw is then tightened causing the barrel portion to be forced down into the recess 18 and the connected links to be automatically inclined to the proper position to be disconnected even if there is a considerable amount of tension on the belt when mounted.

The tool equally as well may be applied to a single pair of connected links for disconnecting the same, after so applied the drive pin is placed in position as above described.

I claim:

A tool for disconnecting one section of a link belt from another, comprising a body having at one end a tubular portion and at the other end longitudinal and diverging flanges to form a trough like structure with the apex of its inner surfaces being in longitudinal alignment with the opening of said tubular portion, the inner end of the inner surface of said trough being provided with a recess to receive the larger barrel portion of a pair of connected links with their pivot centers in alignment with the opening of said tubular portion with the sides of the link portions against the inner faces of said flanges to support the links in their proper position for disconnection, a driving pin in said tubular portion with its inner end engaging one end of the pivot portion of said chain, the inner end of said tubular portion of the body having a bracket provided with an end portion overhanging the center of said recess and the barrel of said links, and a radially disposed set screw in said bracket to move toward and from said chain barrel.

References Cited in the file of this patent

UNITED STATES PATENTS

| Number | Name | Date |
|---|---|---|
| 2,379,001 | Hage | June 26, 1945 |
| 2,397,513 | Smith | Apr. 2, 1946 |
| 2,616,241 | Palsgrove | Nov. 4, 1952 |

FOREIGN PATENTS

| Number | Country | Date |
|---|---|---|
| 133,589 | Great Britain | Oct. 16, 1919 |